Patented July 6, 1937

2,086,230

UNITED STATES PATENT OFFICE 2,086,230

MANUFACTURE OF SOLUTIONS

Paul C. Lemmerman, Cleveland Heights, Ohio, assignor, by mesne assignments, to E. I. du Pont de Nemours & Company, Wilmington, Del., a corporation of Delaware No Drawing. Application June 14, 1934, Serial No. 730,679

12 Claims. (Cl. 23—110)

This invention relates to a process for making clear solutions of alkali metal silicates, and is particularly directed to processes wherein an alkali metal silicate glass is dissolved in water at a superatmospheric pressure and at a temperature above 212° F., the solution, throughout the process, being maintained under such conditions as to prevent any substantial amount of boiling. This invention also includes numerous other steps which, together with the above, lead to the production of particularly clear, water white silicate solutions.

It has heretofore been the practice to dissolve alkali metal silicates either in an open dissolving vessel or in an autoclave at relatively low pressures. When an autoclave is used, it has been the practice to discharge the solution by utilizing the pressure in the autoclave to blow the solution to settling or storage tanks.

These processes, with numerous modifications, have found extensive commercial application, but the solutions obtained are milky or cloudy. Such cloudy solutions are accepted for use in many relations, but largely because clear solutions are unobtainable at a comparable cost.

Clear solutions of alkali metal silicates have been made by certain involved processes which include filtration, but their cost is necessarily high and they have found use only in applications which require such clear solutions at any price.

I have found that clear solutions of alkali metal silicates can be made, by the processes set forth hereinafter, with little modification of the equipment now used and at a cost equal to or slightly lower than that of the cloudy solutions heretofore marketed.

The cloudiness, or haze, of the solutions is, I have found, due largely to the presence of hydrated silica. The prior art processes have inadvertently promoted the formation of hydrated silica, with the result that the solutions were inevitably cloudy. In open dissolving tanks, at the temperatures used, a perfectly clear solution would soon become cloudy. When autoclaves are used, the customary step of relieving the pressure on the hot solution causes the formation of haze. The cloudiness thus caused by the presence of hydrated silica is relatively permanent. I have found that the alkali metal silicate glass should be dissolved under pressure and at a relatively high temperature, it should not at any time be permitted to boil, and the solution should be allowed to settle at temperatures below about 170° F. Various other steps which aid in the manufacture of a clear solution will be described hereafter.

Before discussing the various steps and conditions in detail, the following specific example is given to aid in an understanding of the order and relationship of steps in one of my preferred processes.

*Example 1.*—A well fused, water-spray-cooled glass, low in impurities, and having a ratio of about 3.25 to 1 of $SiO_2$ to $Na_2O$ was crushed to reduce the average size to about one-half inch. 1400 pounds of this sodium silicate was charged into a clean, iron autoclave and 165 gallons of water added. The autoclave used was of the rotating drum type, 4 feet in diameter and 4 feet long.

The autoclave was sealed and started rotating at about 14 R. P. M., which rate of rotation was maintained throughout the dissolving period. Steam at a little over 100 lbs. pressure, was rapidly admitted into the autoclave until the contents were heated to about 212° F. This heating up period required about 20 minutes.

The rotation of the autoclave was stopped, and trapped air blown from the autoclave with steam for about 5 minutes. The air release cock was then closed and rotation of the autoclave resumed.

The steam was left on until a pressure of about 100 pounds per square inch was reached in the autoclave. It was then shut off and the autoclave kept revolving at this pressure for 1½ hours. At the end of this time the sodium silicate glass was substantially all dissolved.

The autoclave, still revolving, was then cooled to below 212° F. by means of water sprays over the outside of the shell. This cooling required about 20 minutes. The contents of the autoclave were blown to a settling tank by means of steam at 30 pounds pressure. The solution as conveyed to the settling tank had a density of 41.0° Bé. and was diluted with water to 40.0° Bé. It was slightly milky in appearance because of dispersed silica, but after four days of settling was a sparkling, water white. The settling was performed by keeping the solution at 150° F. for three days and then permitting it to air cool slowly.

The sodium silicate solution showed no trace of cloudiness and was equal in appearance to commercial filtered solutions.

Considering now, in more detail, the individual steps and conditions, it is noted that the glass used above was water spray cooled, low in impurities, and well fused. These properties represent an optimum, but need not all be present. The alkali metal silicate should be well fused in the furnace and should, consequently, contain a minimum of unreacted silica. If the alkali metal silicate used is not well fused, the final solution may be a little cloudy, but even so it is highly superior to a prduct producible from a comparable glass by the prior art dissolving and settling processes.

The glass should be either water-spray cooled or air cooled if the best results are to be obtained. If the glass is cooled as it leaves the furnace by dropping it into water the resulting glass produces a slightly inferior solution.

If the glass is not low in impurities, the resulting solution may be somewhat colored, though clear. The color can be removed in any desired manner either during or following my procedure.

The glass used may have any desired ratio. The ratio, so called, is the ratio of $SiO_2$ to $Na_2O$. In the example above a 3.25 ratio glass was employed. Glasses with a lower ratio are much easier to settle clear. For instance, a 2.90 ratio glass is fairly quickly settled and a rather clear solution may be obtained without following all of my precautions. A slightly better product results from the use of my process in practically any case, but its greatest usefulness is found in handling glasses with ratios of about 3.25 to 3.30. I am of the opinion that with an increase of ratio the glass becomes less stable and exhibits a rapidly increasing tendency to form hydrated silica. The step of cooling prior to discharge of the solution to atmospheric pressures is therefore of peculiar utility with glass of a ratio of about 3.25 or more.

The water employed was ordinary tap water, and no particular precautions in this connection need be regarded unless the local water supply is unusually impure. If the water contains an excessive amount of akali metal and iron salts it may be desirable to remove them by a suitable pretreatment to avoid contamination of the product.

The glass was crushed to fairly small size in order to make the dissolving more rapid. Obviously, the size may be widely varied, but as small a size as is economically feasible should be used as the time of dissolving should be as short as possible from an economic standpoint. Other expedients for aiding quick dissolving may, obviously, be used.

In the above example the steam was admitted as rapidly as possible in order to bring the autoclave up to pressure quickly. It is very desirable to cut to a minimum the time of heating water with the silicate glass at low pressures and other, or additional, expedients may be employed to accomplish this desideratum.

The rate of rotation of the autoclave may be widely varied, though if it is too fast the solution obtained will be somewhat cloudy and if it is too slow the silicate glass will tend to coalesce and will be dissolved more slowly. In general I prefer to operate at as slow a rate of rotation as can be used without markedly increasing the time required to dissolve the silicate. With a revolving autoclave of the kind described in Example 1, one revolution per minute was a little too slow and at thirty revolutions per minute the solution produced was somewhat hazy. These rates represent the upper and lower limits on the rate of rotation for the particular autoclave of Example 1.

While I have disclosed only a rotated type of autoclave, I may use any type of pressure vessel. The autoclave used will preferably be of a type provided with means for agitating the charge.

The autoclave contents are preferably heated by discharging steam into the liquid, but any other heating means may be used. For example, the autoclave may be externally heated with steam, gas, coal, etc. in any suitable manner, or it may be internally heated by a suitable heat exchange using steam, hot gases, electricity, etc. If a relatively small autoclave is used, the condensation of steam may be somewhat excessive when the heating is effected by running steam into the autoclave, in which event it may be desirable to use a suitable external or internal heating means in conjunction with the steam.

The time required to dissolve the silicate varies considerably, but generally is from about one to three hours. After the silicate is dissolved no injury seems to result to the solution by reason of continued exposure to the heat and pressure. In fact, one solution was held in the autoclave under heat and pressure for four hours without apparent damage to the clarity of the final solution.

While some of the above factors affect, as noted, the clarity of the solution obtained, the most critical conditions are the pressure, temperature and the absence of boiling.

I prefer to use a pressure of about one hundred pounds to the square inch, but any higher pressure is equally satisfactory. Eighty pounds pressure gives very good results, but below about sixty pounds pressure the solutions obtained are definitely cloudy. Pressures as low as sixty pounds to the square inch produce practically clear solutions if well fused glass is used and if other conditions are optimum. In general, I may use pressures above about sixty pounds, but I prefer to use pressures above about one hundred pounds.

The temperature used preferably substantially corresponds to the boiling point of the solution at the pressure used. For example, when indirect heat is employed the pressure in the autoclave is generated by the evaporation of the solution in the autoclave, so the solution will be substantially at its boiling point at the prevailing pressure. When steam is introduced into the autoclave and the air removed, as in Example 1, the temperature corresponds to the boiling point of water at the prevailing pressure. In general, I prefer to use superatmospheric pressures, and temperatures above about 212° F. Of course, according to the procedure of Example 1, the temperature and pressure will drop during the dissolving period. I may, if desired, maintain the pressures and temperatures by the continued application of steam or heat, but the procedure of Example 1 has proven quite satisfactory. It is here noted that I find it preferable to remove air from the autoclave, as in Example 1, but this step is not essential to my process.

The remaining condition which is quite important, that of preventing boiling, must be maintained throughout the process. When, as in Example 1, air is blown from the autoclave, the solution should be close to the atmosphere boiling point, for if it were substantially higher the release of the entrapped air would cause violent boiling of the solution. Some slight amount of boiling may occur during the heating of the solution, but no particularly deleterious effects seem to result.

When the silicate is dissolved, the solution under pressure should not be discharged to the atmosphere as has been done heretofore, as, being at a temperature considerably above 212° F., it boils violently. I have found that this boiling causes the solution to become permanently cloudy. To avoid this boiling, I may, as in Example 1, cool the autoclave to a temperature below its atmospheric boiling point before discharging the solution. Of course, the autoclave is out of use during this cooling period and to avoid the autoclave being inactive during this operation I may discharge its contents through a cooling coil. The solution may thus be released to the atmosphere at a temperature below its boiling point. Any type of heat exchange may be used to cool the solution. I do not fully understand the effect of boiling the solution, but it must be avoided if a clear solution is to be obtained.

Steam, preferably at a fairly low pressure, is used in order to blow the solution to a settling tank. In Example 1, for instance, low pressure steam was applied to the autoclave and the contents blown to a settling tank. Air must not be used for this purpose as it causes the solution to become permanently cloudy by preventing the precipitation of the otherwise easily settleable impurities.

The specific gravity of the solution obtained depends largely, of course, upon the relative quantities of silicate and water employed. Usually, I prefer to use a little more silicate glass than is required and then dilute the solution to the desired specific gravity.

The time required to settle the solution depends upon the specific gravity of the solution, upon the $SiO_2/Na_2O$ ratio, and upon its temperature during the settling period.

I preferably follow the procedure of Example 1 as to temperatures. That is, the solutions are held at about 150° F. for three days and then permitted to drop to room temperature and settle until clear. Care must be exercised lest the solutions become hazy because of standing at too high a temperature. The following shows the length of time in which clear, 40° Bé. solutions of 3.25 ratio glass become perceptibly hazy:

| Temperature—°F. | Time—Days |
| --- | --- |
| 190 | 1 |
| 180 | 2 |
| 170 | 4 |
| 160 | 7 |
| 150 | Still clear after 8 days. |

I generally prefer to settle the solutions at about 150° F., though any lower temperature may be used with a corresponding increase in the time required to completely settle the solutions. Generally, I find it preferable to use temperatures below about 170° F. The temperature may, if desired, be maintained throughout the settling period, or preferably, as above noted, used for only a portion of the settling period.

Following the temperature control of Example 1, a 42.2 Bé. solution settled water white in 20 days. A 41.0° Bé. solution settled water white in 15 days, while a 40° Bé. solution required, as above noted, only 4 days. Accordingly, I prefer to settle the solutions at the specific gravity which is desired rather than settling concentrated solutions and diluting later. It is noted that the settling time increases very rapidly with an increase in specific gravity as the viscosity of silicate solutions increases very rapidly with fairly small increases of specific gravity. An increase in ratio also makes the solutions more difficult to settle.

The following example illustrates the process of my invention using an exceptionally well-fused glass:

*Example 2.*—1120 lbs. of a well-fused sodium silicate was crushed and charged into an iron autoclave with 172 gallons of water. The autoclave was started to rotating, as in Example 1, and steam admitted thereinto until a pressure of 90 lbs. per square inch was reached. As soon as solution was complete the charge was blown through a cooling coil to a settling tank, using low pressure steam (about 30 pounds) as required. A 40° Bé. solution was obtained which settled water white in 3 days. The settling time was probably shorter than Example 1 by reason of the fact that the glass of this example was very well fused.

While the clearest solutions are obtained by employing all of the foregoing expedients, I do not intend to be limited to the combination of all of them. Excellent solutions may be obtained using superatmospheric pressure and a temperature above about 212° F. with or without some or all of the steps above described, provided, of course, that boiling of the solution be prevented. I do not intend, therefore, to be limited to the specific conditions set forth above, but limit my invention only as set forth in the following claims.

I claim:

1. In a process of treating an alkali metal silicate glass to produce a clear solution thereof, the steps comprising dissolving the glass in a pressure receptacle at a superatmospheric pressure sufficient to prevent boiling and at a temperature above about 212° F. and, before relieving the pressure, cooling the solution to a temperature below that at which it would boil at atmospheric pressure.

2. In a process of treating a well fused alkali metal silicate glass to produce a clear solution thereof, the steps comprising dissolving the glass in an autoclave at a superatmospheric pressure and at a temperature substantially corresponding to the boiling point of water at the prevailing pressure, the temperature and pressure being obtained by charging steam into the autoclave, and, without releasing the pressure, cooling the solution to a temperature below that at which it would boil at atmospheric pressure.

3. In a process of treating an alkali metal silicate glass to produce a clear solution thereof, the steps comprising dissolving the glass in an autoclave at a superatmospheric pressure and at a temperature substantially corresponding to the boiling point of water at the prevailing pressure, the temperature and pressure being obtained by charging steam into the autoclave, and, without releasing the pressure, cooling the solution to a temperature below that at which it would boil at atmospheric pressure, discharging the solution to a settling tank, and settling until clear at a temperature below about 170° F.

4. In a process of treating an alkali metal silicate glass to produce a clear solution thereof, the steps comprising putting the alkali metal silicate glass and water into an autoclave, blowing some of the air from the autoclave without previously raising the temperature of the mixture above boiling, sealing the said autoclave, dissolving the glass at a pressure of no less than about eighty pounds per square inch and at a temperature substantially that of the boiling point of water at the prevailing pressure, cooling the solution to a temperature below that at which it would boil at atmospheric pressure by discharging the contents of the autoclave through a cooling means while maintaining the solution under pressure, and settling the solution at a temperature no higher than about 160° F.

5. In a process of treating an alkali metal silicate glass to produce a clear, water white solution thereof, the steps comprising: charging the glass and water into an autoclave, sealing the autoclave, agitating the autoclave contents at as slow a rate as will not markedly prolong the dissolving period, heating the autoclave contents to a temperature above about 212° F., the autoclave contents being under superatmospheric pressure sufficient to prevent boiling, and cooling the autoclave contents to a temperature below their atmospheric boiling point without previously releasing the pressure.

6. In a process of treating an alkali metal silicate glass to produce a clear solution thereof, the steps comprising: charging the glass and water into an autoclave, sealing the autoclave, agitating the autoclave contents at as slow a rate as will not markedly prolong the dissolving period, charging steam into the autoclave to produce a superatmospheric pressure sufficient to prevent boiling, cooling the autoclave contents to a temperature below their atmospheric boiling point without previously releasing the pressure, and settling the solution at a temperature not higher than about 150° F.

7. In a process of treating an alkali metal silicate glass to produce a clear solution thereof, the steps comprising: charging the glass and water into an autoclave, sealing the autoclave, submitting the autoclave to a pressure of no less than about 80 pounds by admitting steam thereinto, cooling the solution to a temperature below that at which it would boil at atmospheric pressure without previously releasing the pressure, blowing the solution to settling tanks with low pressure steam, and settling the solution at a temperature no higher than about 150° F.

8. In a process of treating an alkali metal silicate glass to produce a clear solution thereof, the steps comprising dissolving the glass in a pressure receptacle at an elevated temperature and a pressure sufficient to prevent boiling, and, before relieving the pressure, cooling the solution to a temperature below that at which it would boil at atmospheric pressure.

9. In a process of treating an alkali metal silicate glass to produce a clear solution thereof, the steps comprising dissolving the glass in a pressure receptacle at an elevated temperature and a pressure sufficient to prevent boiling, and, before relieving the pressure, passing the solution thru a cooling means to cool it to a temperature below that at which it would boil at atmospheric pressure.

10. In a process of treating an alkali metal silicate glass to produce a clear solution thereof, the steps comprising dissolving the glass at a temperature above about 212° F., and at an elevated pressure such that any substantial amount of boiling of the liquid is prevented throughout the dissolving process, and before relieving the pressure, cooling the solution to a temperature below that at which it would boil at atmospheric pressure.

11. In a process of treating an alkali metal silicate glass to produce a clear solution thereof, the steps comprising dissolving the glass at an elevated temperature and at such a pressure that substantial boiling of the solution is avoided, and, before relieving the pressure, cooling the solution to a temperature below that at which it would boil at atmospheric pressure.

12. In a process of treating an alkali metal silicate glass to produce a clear solution thereof, the steps comprising dissolving the glass at an elevated temperature and at such a pressure as will avoid a substantial boiling thereof, and, before relieving the pressure, cooling the solution to a temperature below that at which it would boil at atmospheric pressure by passing it through cooling means.

PAUL C. LEMMERMAN.